United States Patent
Ho et al.

(10) Patent No.: US 9,706,819 B2
(45) Date of Patent: Jul. 18, 2017

(54) SMART UMBRELLA AND HANDLE THEREOF

(71) Applicants: Kuo Pao Chen, Taichung (TW); Ching Chang Ho, Taichung (TW); Li Juan Chang, Huainan, Anhui (CN); Ai Hui Huang, Changhua Hsien (TW)

(72) Inventors: Ching Chang Ho, Taichung (TW); Kuo Pao Chen, Taichung (TW); Li Juan Chang, Anhui (CN)

(73) Assignees: Kuo Pao Chen, Taichung (TW); Ching Chang Ho, Taichung (TW); Li Juan Chang, Huainan Anhui (CN); Ai Hui Huang, Changhua Hsien (TW)

( * ) Notice: Subject to any disclaimer, the term of this patent is extended or adjusted under 35 U.S.C. 154(b) by 0 days.

(21) Appl. No.: 15/012,990

(22) Filed: Feb. 2, 2016

(65) Prior Publication Data

US 2017/0055651 A1 Mar. 2, 2017

(30) Foreign Application Priority Data

Aug. 24, 2015 (CN) ..................... 2015 2 0640335 U

(51) Int. Cl.
  *G08B 13/14* (2006.01)
  *A45B 9/02* (2006.01)
  *A45B 25/00* (2006.01)
  *H04W 4/00* (2009.01)

(52) U.S. Cl.
  CPC ............... *A45B 9/02* (2013.01); *A45B 25/00* (2013.01); *H04W 4/008* (2013.01); *A45B 2025/003* (2013.01)

(58) Field of Classification Search
  CPC ....................................................... A45B 9/02
  USPC ........................................................ 375/219
  See application file for complete search history.

(56) References Cited

U.S. PATENT DOCUMENTS

| | | | | |
|---|---|---|---|---|
| 2008/0163908 A1* | 7/2008 | O'Kere | ................... | A45B 3/00 135/16 |
| 2012/0235477 A1* | 9/2012 | Korman | ................ | H01L 31/042 307/11 |
| 2014/0145845 A1* | 5/2014 | Sattari | .................... | G08B 21/22 340/539.13 |
| 2015/0156567 A1* | 6/2015 | Oliver | ..................... | H04Q 9/00 340/870.07 |
| 2015/0216273 A1* | 8/2015 | Akin | ....................... | A45B 25/00 135/16 |
| 2016/0066664 A1* | 3/2016 | Liu | ........................ | H04R 1/025 381/77 |
| 2016/0326765 A1* | 11/2016 | Barbret | ................... | E04H 15/02 |
| 2016/0340926 A1* | 11/2016 | Barbret | ................... | E04H 15/28 |
| 2016/0360841 A1* | 12/2016 | Ho | .......................... | A45B 9/02 |

FOREIGN PATENT DOCUMENTS

CN 202276927 U 6/2012

* cited by examiner

*Primary Examiner* — Santiago Garcia

(57) ABSTRACT

A handle is mounted on a smart umbrella and contains: a safety device mounted in the handle. The safety device includes a printed circuit board arranged thereon, and the printed circuit board has a bluetooth module and a power module which are fixed on the printed circuit board. The bluetooth module is configured to connect with a bluetooth module of the smart terminal, and when the bluetooth module of the printed circuit board does not connect with the bluetooth module of the smart terminal, the smart terminal sends alert.

4 Claims, 6 Drawing Sheets

SMART UMBRELLA AND HANDLE THEREOF

FIELD OF THE INVENTION

The present invention relates to a smart umbrella, and more particularly to a handle mounted on the smart umbrella.

BACKGROUND OF THE INVENTION

A conventional umbrella is employed to shield sunlight, rainwater, and snows. However, it is lost and is left easily in public places, such as supermarket, school, company, hospital, or public transportation.

To solve above-mentioned problem, an anti-lost handle mounted on an umbrella is disclosed in CN 202276927U and contains a body on which an accommodation groove is defined so as to house a code lock, wherein a first end of a tongue of the code lock is disposed on a bottom of the body, and a second end of the tongue has a retaining slot for mating with the accommodation groove of the body, hence the umbrella is locked on a umbrella holder to avoid getting lost.

However, user may forget unlocking the umbrella from the umbrella holder, and a password cannot be always memorized by the user. When the user forgets unlocking the umbrella, the umbrella is left in the umbrella holder. Likewise, a theft removes the code lock to steal the umbrella, and the umbrella is too heavy to be portable easily.

The present invention has arisen to mitigate and/or obviate the afore-described disadvantages.

SUMMARY OF THE INVENTION

The primary objective of the present invention is to provide a handle which is mounted on a smart umbrella so as to avoid the smart umbrella getting lost and being stolen, and the smart umbrella detects UV intensity, temperature, and humidity easily.

Another objective of the present invention is to provide a handle which is simplified and is portable and operable easily.

To obtain the above objectives, a handle mounted on a smart umbrella and provided by the present invention contains: a safety device mounted in the handle.

The safety device includes a printed circuit board arranged thereon, and the printed circuit board has a bluetooth module and a power module which are fixed on the printed circuit board. The bluetooth module is configured to connect with a bluetooth module of the smart terminal, and when the bluetooth module of the printed circuit board does not connect with the bluetooth module of the smart terminal, the smart terminal sends alert.

Preferably, the printed circuit board also has a first detector configured to sense ultraviolet ray and has a data processing unit, wherein the first detector is electrically connected with the data processing unit, the data processing unit is electrically connected with the bluetooth module so as to transmit ultraviolet ray information to the bluetooth module, and the bluetooth module sends the ultraviolet ray information to a smart terminal.

Preferably, the printed circuit board further has a second detector for detecting temperature and humidity and a data processing unit, wherein the second detector is electrically coupled with the data processing unit, and the data processing unit is electrically connected with the bluetooth module of the printed circuit board, the data processing unit processes and transmits temperature information and humidity information to the bluetooth module of the printed circuit board, and the bluetooth module of the printed circuit board sends the temperature information and the humidity information to a smart terminal.

Preferably, the printed circuit board further has a second detector for detecting temperature and humidity, the second detector is electrically coupled with the data processing unit, and the data processing unit is electrically connected with the bluetooth module of the printed circuit board.

Preferably, the power module is a button cell battery.

Preferably, the smart terminal is any one of a cellular phone, a tablet computer, and a notebook computer.

Preferably, a bluetooth chip of the bluetooth module of the printed circuit board is BLE4.0 chip.

Preferably, a smart umbrella contains any handle as described in any one of the preceding preferred embodiments.

In operation, the safety device is mounted in the handle, the power module of the safety device is electrically conducted, and the bluetooth module of the terminal is turned on so as to search and connect with the bluetooth module of the safety device within a predetermined distance.

As the bluetooth module of the smart terminal connects with the bluetooth module of the safety device, the smart terminal displays connection succeeded. In the meantime, the first detector and the second detector of the safety device sense the UV intensity, the temperature, and the humidity in the circumstance, and the UV information, temperature information, and humidity information are transmitted to and are processed by the data processing unit, thereafter the data processing unit sends the UV information, the temperature information, and the humidity information to the bluetooth module, then the bluetooth module transmits the UV information, the temperature information, and the humidity information to the smart terminal so as to display the UV information, the temperature information, and the humidity information on the smart terminal. Thus, a user decides his/her destination based on the UV information, the temperature information, and the humidity information easily.

As the smart umbrella is left in other places or is taken away by someone else, and a distance between the handle and the smart terminal is more than a predetermined safety distance, the bluetooth module of the safety device does not connect with the bluetooth module of the smart terminal, so the smart terminal makes alert to the user. Thereby, the smart umbrella avoids getting lost and being stolen, and the smart umbrella detects the UV intensity, the temperature, and the humidity.

DETAILED DESCRIPTION OF THE PREFERRED EMBODIMENTS

Figure 1:
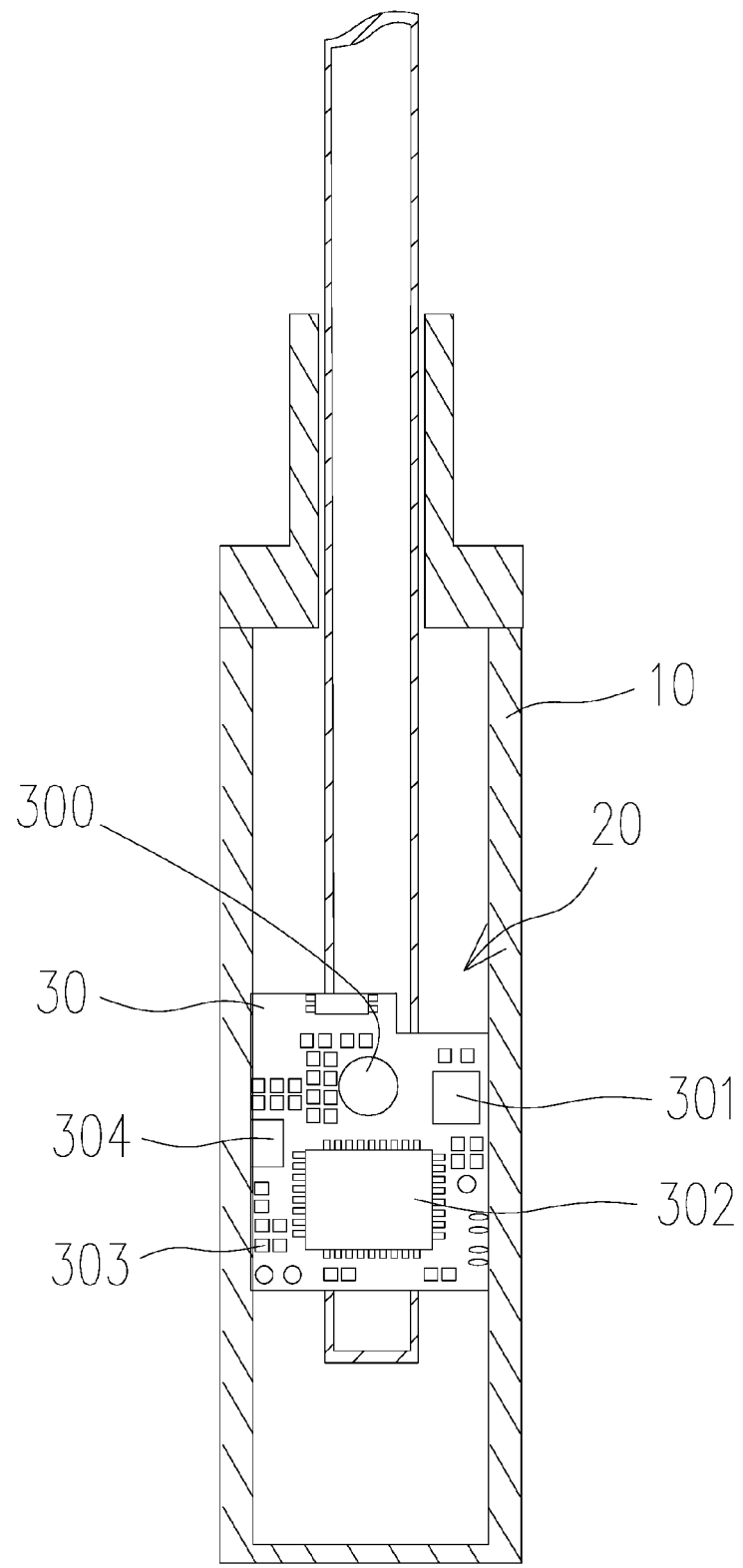
FIG. 1 is a cross sectional view showing the assembly of a handle of a smart umbrella according to a first embodiment of the present invention.
Figure 2:
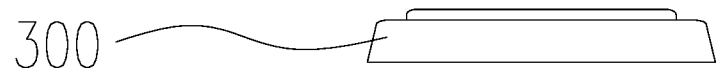
FIG. 2 is a side plan view of a button cell battery according to the first embodiment of the present invention.

With reference to FIGS. 1 and 2, wherein FIG. 1 is a cross sectional view showing the assembly of a handle of a smart umbrella according to a first embodiment of the present invention, the handle 10 comprises: a safety device 20 mounted in the handle 10. The safety device 20 includes a printed circuit board (PCB) 30 arranged thereon, and the PCB 30 has a bluetooth module 303 and a power module 300 which are fixed on the PCB 30. To detect ultraviolet (UV) intensity in circumstance, the PCB 30 also has a first detector 301 configured to sense ultraviolet ray and has a data processing unit 302, wherein the first detector 301 is electrically connected with the data processing unit 302, the data processing unit 302 is electrically connected with the bluetooth module 303 so as to transmit data to the bluetooth module 303, and the bluetooth module 303 sends the data to a smart terminal 50. The bluetooth module 303 is configured to connect with a bluetooth module of the smart terminal 50, wherein when the bluetooth module 303 does not connect with the bluetooth module of the smart terminal 50, the smart terminal 50 sends alert. The first detector 301 transmits detected ultraviolet (UV) information to the data processing unit 302 so that the data processing unit 302 processes and transmits the detected UV information to the bluetooth module 303. Thereafter, the bluetooth module 303 sends the detected UV information to the smart terminal 50, thus detecting the (UV) intensity in the circumstance.

To detect temperature and humidity in the circumstance, the PCB 30 further has a second detector 304 for detecting the temperature and the humidity, wherein the second detector 304 is electrically coupled with the data processing unit 302, and the data processing unit 302 is electrically connected with the bluetooth module 303.

Figure 3:
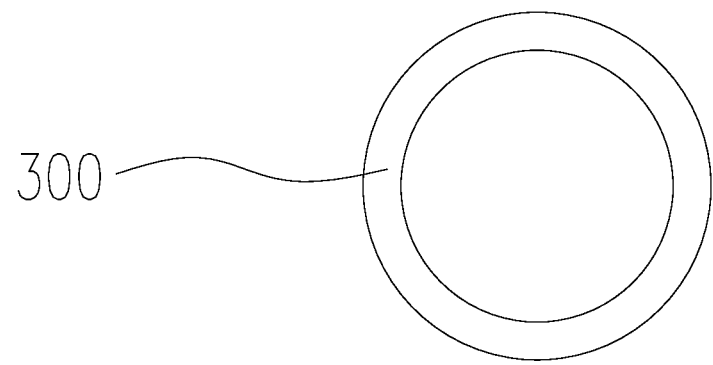
FIG. 3 is a top plan view of the button cell battery according to the first embodiment of the present invention.

To reduce power consumption of the safety device 20, the power module 300 is a button cell battery, as shown in FIGS. 2 and 3. FIG. 2 is a side plan view of the button cell battery, and FIG. 3 is a top plan view of the button cell battery. In this embodiment, the button cell battery 401 is lithium-manganese dioxide cell battery CR2032 so as to prolong service life and save power consumption.

In this embodiment, the smart terminal is a cellular phone. Preferably, the smart terminal is a tablet computer or a notebook computer.

To reduce manufacture cost and power consumption, a bluetooth chip of the bluetooth module 303 is BLE4.0 chip which consumes less power.

Figure 4:
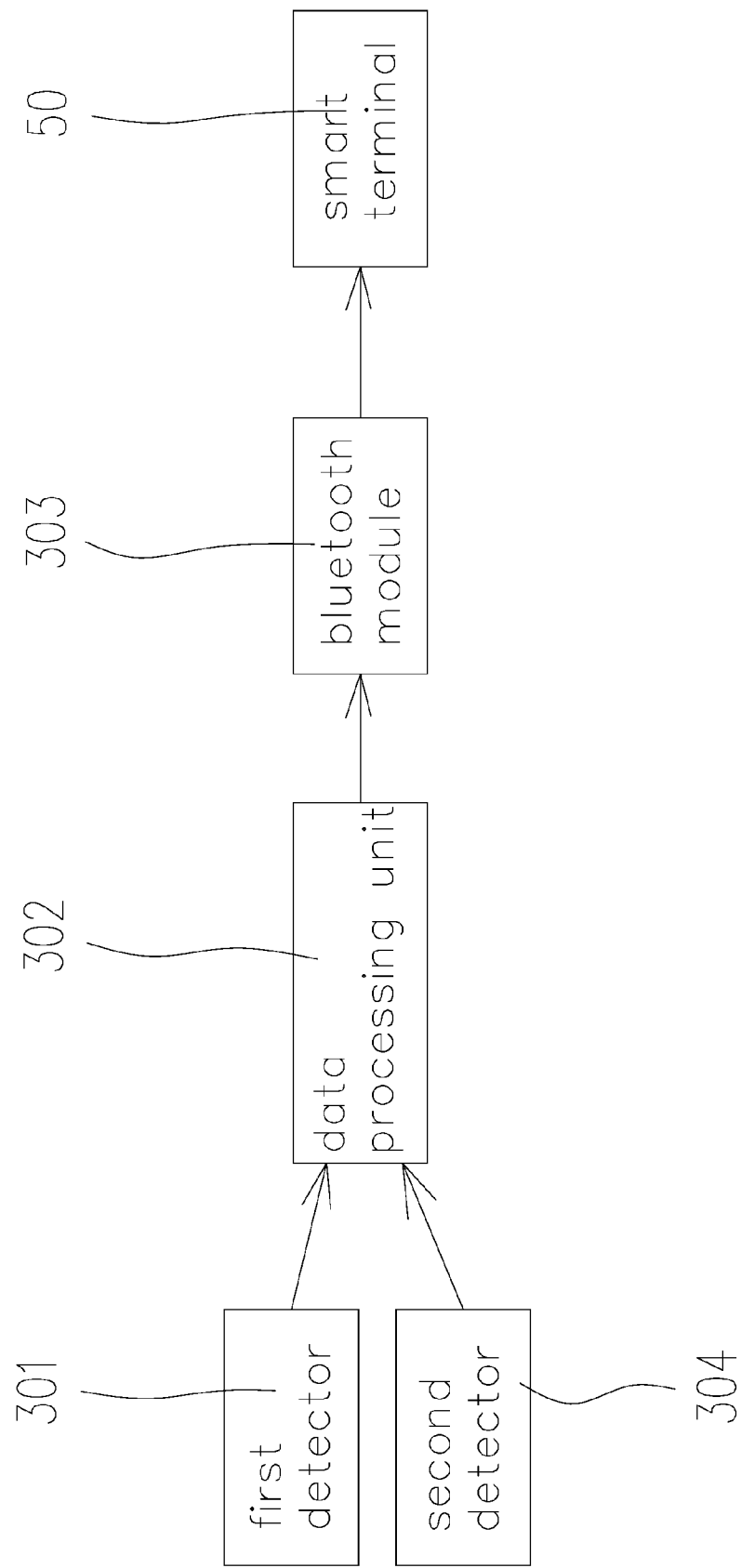
FIG. 4 is a flow chart showing the operation of the handle of the smart umbrella according to the first embodiment of the present invention.

With reference to FIG. 4, in operation, the safety device 20 is mounted in the handle 10, the power module 300 of the safety device 20 is electrically conducted, and the bluetooth module of the terminal 50 is turned on so as to search and connect with the bluetooth module 303 of the safety device 20 within a predetermined distance. As the bluetooth module of the smart terminal 50 connects with the bluetooth module 303 of the safety device 20, the smart terminal 50 displays connection succeeded. In the meantime, the first detector 301 and the second detector 304 of the safety device 20 sense the UV intensity, the temperature, and the humidity in the circumstance, and the UV information, temperature information, and humidity information are transmitted to and are processed by the data processing unit 302, thereafter the data processing unit 302 sends the UV information, the temperature information, and the humidity information to the bluetooth module 303, then the bluetooth module 303 transmits the UV information, the temperature information, and the humidity information to the smart terminal 50 so as to display the UV information, the temperature information, and the humidity information on the smart terminal 50. Thus, a user decides his/her destination based on the UV information, the temperature information, and the humidity information easily. As the smart umbrella is left in other places or is taken away by someone else, and a distance between the handle 10 and the smart terminal 50 is more than a predetermined safety distance, the bluetooth module 303 of the safety device 20 does not connect with the bluetooth module of the smart terminal 50, so the smart terminal 50 makes alert to the user. Thereby, the smart umbrella avoids getting lost and being stolen, and the smart umbrella detects the UV intensity, the temperature, and the humidity.

Figure 5:
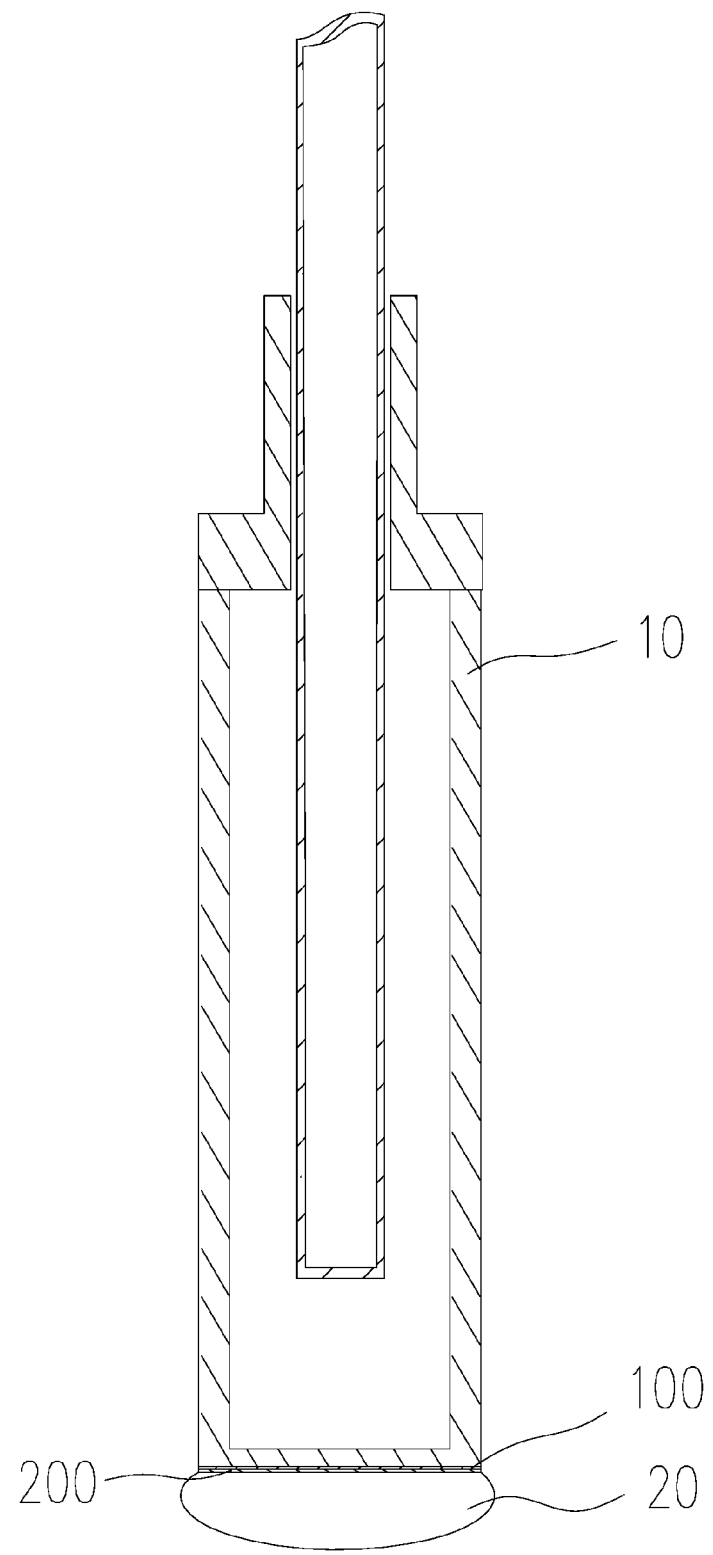
FIG. 5 is a cross sectional view showing the assembly of a handle of a smart umbrella according to a second embodiment of the present invention.
Figure 6:
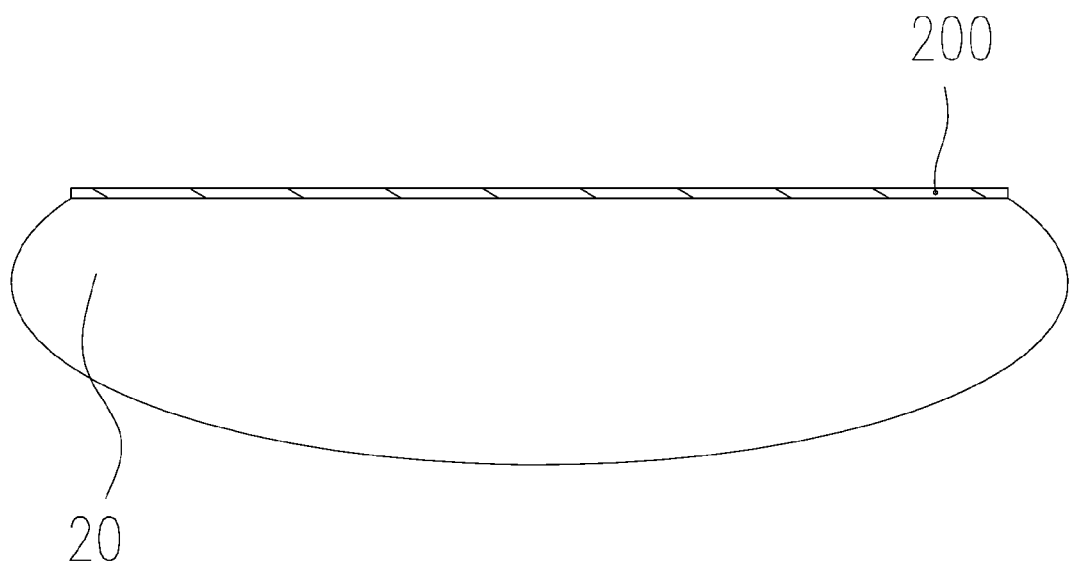
FIG. 6 is a side plan view of a safety device of FIG. 5.
Figure 7:
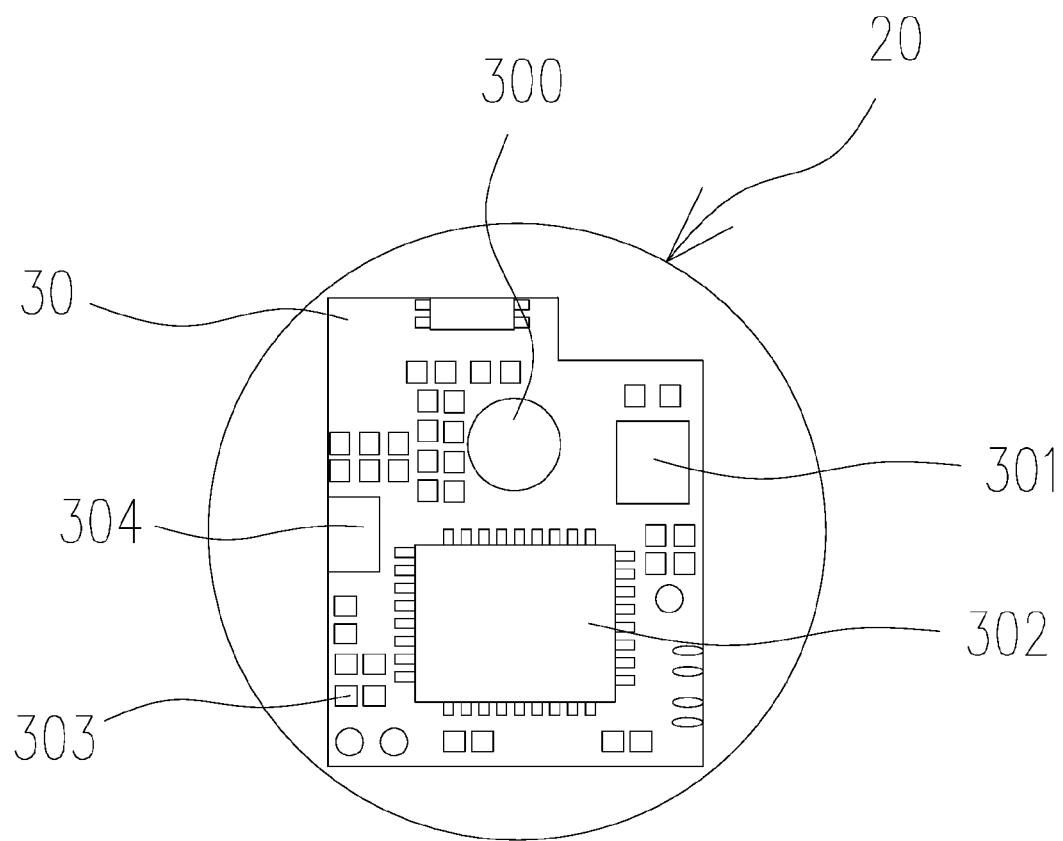
FIG. 7 is a side plan view of the assembly of the safety device of FIG. 6.

Referring to FIGS. 5 to 7, a difference of a second embodiment of a handle 20 from that of the first embodiment comprises: a safety device 20 being removal from the handle 10, wherein the handle 10 has a first magnet 100, and the safety device 20 has a second magnet 200 configured to magnetically attract with the first magnet 100, hence the safety device 20 is mounted on the handle 10. As shown in FIG. 6, the safety device 200 is formed in an inverted hat shape so as to matingly fix with a bottom of the handle 10. Preferably, the safety device 20 can be in any other shapes according to using requirements.

Furthermore, between the safety device 20 and the handle 10 is defined a locking structure (not shown) so as to fix the safety device 20 and the handle 10 together. The locking structure is a locking tab arranged on the safety device 20, and a connecting orifice is defined on the handle 10 so as to retain with the locking tab of the safety device 20, thus fixing the safety device 20 on the handle 10. Furthermore, between the safety device 20 and the handle 10 is defined a rotatable connection structure (not shown). For example, the safety device 20 has inner threads arranged thereon, and the handle 10 has outer threads formed thereon, such that the inner threads of the safety device 20 rotatably screw with the outer threads of the handle 10, thus fixing the safety device 20 on the handle 10.

Figure 8:
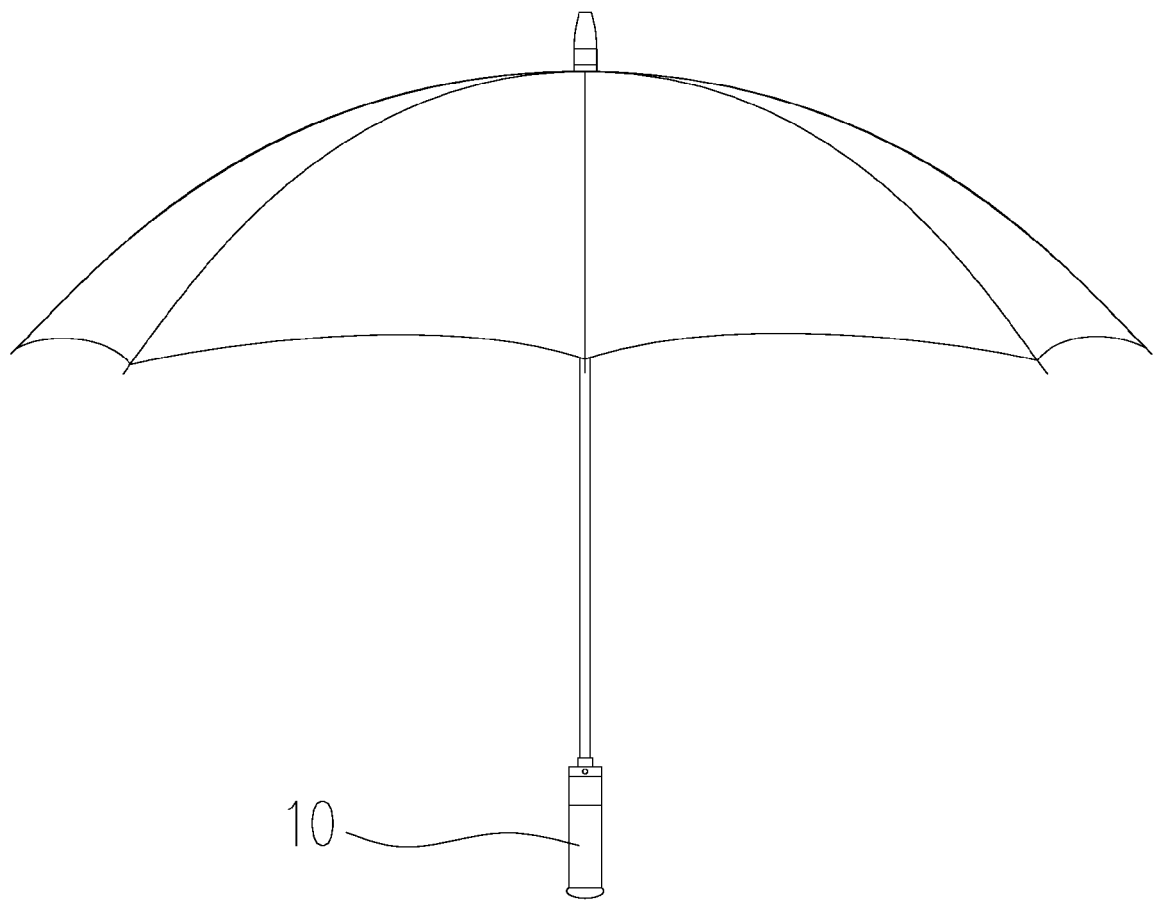
FIG. 8 is a side plane view of the smart umbrella having the handle.

FIG. 8 is a side plane view of the smart umbrella, wherein the smart umbrella has the handle 10.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A handle mounted on a smart umbrella comprising: a safety device (20) mounted in a handle (10)

wherein the safety device (20) includes a printed circuit board (30) arranged thereon, and the printed circuit board (30) has a bluetooth module (303) and a power module (300) which are fixed on the printed circuit board (30);

wherein the bluetooth module (303) is configured to connect with a bluetooth module of the smart terminal (50) and when the bluetooth module (303) of the printed circuit board (30) does not connect with the bluetooth module of the smart terminal (50) the smart terminal (50) sends alert;

wherein the printed circuit board (30) also has a first detector (301) configured to sense ultraviolet ray and has a data processing unit (302) wherein the first detector (301) is electrically connected with the data processing unit (302) the data processing unit (302) is electrically connected with the bluetooth module (303) so as to transmit ultraviolet ray information to the bluetooth module (303) and the bluetooth module (303) sends the ultraviolet ray information to the smart terminal (50); and wherein the printed circuit board (30) further has a second detector (304) for detecting temperature and humidity and the data processing unit (302), wherein the second detector (304) is electrically coupled with the data processing unit (302), and the data processing unit (302) is electrically connected with the bluetooth module (303) of the printed circuit board (30), the data processing unit (302) processes and transmits temperature information and humidity information to the bluetooth module (303) of the printed circuit board (30), and the bluetooth module (303) of the printed circuit board (30) sends the temperature information and the humidity information to the smart terminal (50).

2. The handle as claimed in claim 1, wherein the power module (300) is a button cell battery.

3. The handle as claimed in claim 1, wherein the smart terminal (50) is any one of a cellular phone, a tablet computer, and a notebook computer.

4. The handle as claimed in claim 1, wherein a bluetooth chip of the bluetooth module (303) of the printed circuit board (30) is BLE4.0 chip.

\* \* \* \* \*